United States Patent [19]

Nordeen

[11] 3,766,735
[45] Oct. 23, 1973

[54] BRAKE BOOSTER AND MASTER CYLINDER ASSEMBLY

[75] Inventor: Donald L. Nordeen, East Lansing, Mich.

[73] Assignee: General Motors Corporation, Detroit, Mich.

[22] Filed: May 31, 1972

[21] Appl. No.: 258,248

[52] U.S. Cl. .................... 60/550, 60/553, 91/391 R
[51] Int. Cl. ......................... F15b 7/08, F15b 13/10
[58] Field of Search .................... 60/54.5 P, 54.6 P, 60/54.6 E, 550, 553; 91/391 R

[56] References Cited
UNITED STATES PATENTS

| | | | |
|---|---|---|---|
| 3,559,406 | 2/1971 | Gardner | 60/54.5 P |
| 3,162,018 | 12/1964 | Daley | 60/54.6 P |
| 3,540,219 | 11/1970 | Huruta et al. | 60/54.6 P |
| 3,422,622 | 1/1969 | Arentoft et al. | 60/54.6 P |
| 3,473,329 | 10/1969 | Eggstern | 60/54.6 P |

*Primary Examiner*—Martin P. Schwadron
*Assistant Examiner*—A. M. Zupcic
*Attorney*—W. E. Finken et al.

[57] ABSTRACT

A master cylinder assembly has a secondary piston assembly and a primary piston assembly mounted in a common bore to provide a primary pressurizing chamber between the piston assemblies and a secondary primary chamber between the secondary piston assembly and one end of the bore. The primary piston assembly is composed of two concentric pistons, one extending through a bore in the other. Two input members are provided, one of which is arranged to move both primary pistons concentrically under brake booster power to actuate the master cylinder, and the other of which is arranged to move only one of the primary pistons, without moving the other, to actuate the master cylinder manually when no power assist is available from the booster. The booster assembly is actuated through a manually moved push rod which in turn permits movement of a valve input member forming a part of the booster control valve assembly. The valve input member is arranged so that it normally follows movement of the push rod but is not positively attached thereto. A reaction system in the booster provides for booster "feel" to be transmitted to the input push rod. The booster control valve assembly is mounted in the booster power wall. The power wall includes one or more power diaphragms and is actuated by differential pressures imposed on opposite sides of the diaphragms under control of the control valve assembly. The power wall is connected to move the master cylinder input means which actuates both primary pistons, and is so arranged as to permit movement of the other master cylinder input means without requiring movement of the power wall when no booster assist force is available.

3 Claims, 2 Drawing Figures

PATENTED OCT 23 1973

3,766,735

BRAKE BOOSTER AND MASTER CYLINDER ASSEMBLY

It is common to provide a brake system with a master cylinder having manual pressurizing chambers so that the brake system is divided into two or more fluidly independent brake pressurizing circuits. It is also common to actuate such master cylinders through a power brake booster in order to maintain high level of brake pressurization without requiring high levels of brake pedal pressure or pedal movement under normal operating conditions. The brake booster may be powered pneumatically or hydraulically, it being most common at this time to use a vacuum-atmospheric brake booster in automotive vehicles. In some instances, particularly in trucks, an atmospheric-super-atmospheric air pressure system is used, and in other instances, a hydraulically pressure actuated system is used. In all of these arrangements, an outside power source is depended upon to obtain the power assisting action of the brake booster. The booster can at times have insufficient outside power supplied to it so as to reduce or eliminate the power assist available. While brake boosters in master cylinder assemblies can also be normally actuated manually, there will of necessity be reduced brake effectiveness since less total force is available to actuate the master cylinder.

Different arrangements and proposals are known which will tend to improve the brake effectiveness under such circumstances. It is desirable to accomplish this insofar as possible without requiring a change in the normal brake pedal height, and the normal operation of the brake system should not be materially affected. The manually operated system should be utilized any time there is insufficient power assist and, at the same time, the normal braking operation should not be affected. In order to obtain these goals, and to provide a reasonable brake system with reduced or no-power assist, the braking system is designed so that normal stops can be made with reasonable pedal force exerted by the vehicle operator.

In the preferred embodiment herein disclosed and utilizing the invention to which the claims are directed, increased brake effectiveness is obtained by changing the mechanical advantage between the brake pedal and the master cylinder hydraulic pressure by providing two primary pistons in the master cylinder, and by providing a power brake booster which is arranged to normally actuate both primary pistons. However, if a loss of power assistance occurs, the booster is arranged to actuate only one of the primary pistons. This has the effect of changing the brake pedal ratio when power assist is not available and results in a greater hydraulic pressure output per unit of brake pedal apply force. The brake booster is also arranged to apply the brake pedal force through the brake pedal push rod directly to the master cylinder so that the booster power wall does not have to be displaced. The invention herein claimed is directed to the brake booster and master cylinder assembly.

IN THE DRAWING

Figure 1:
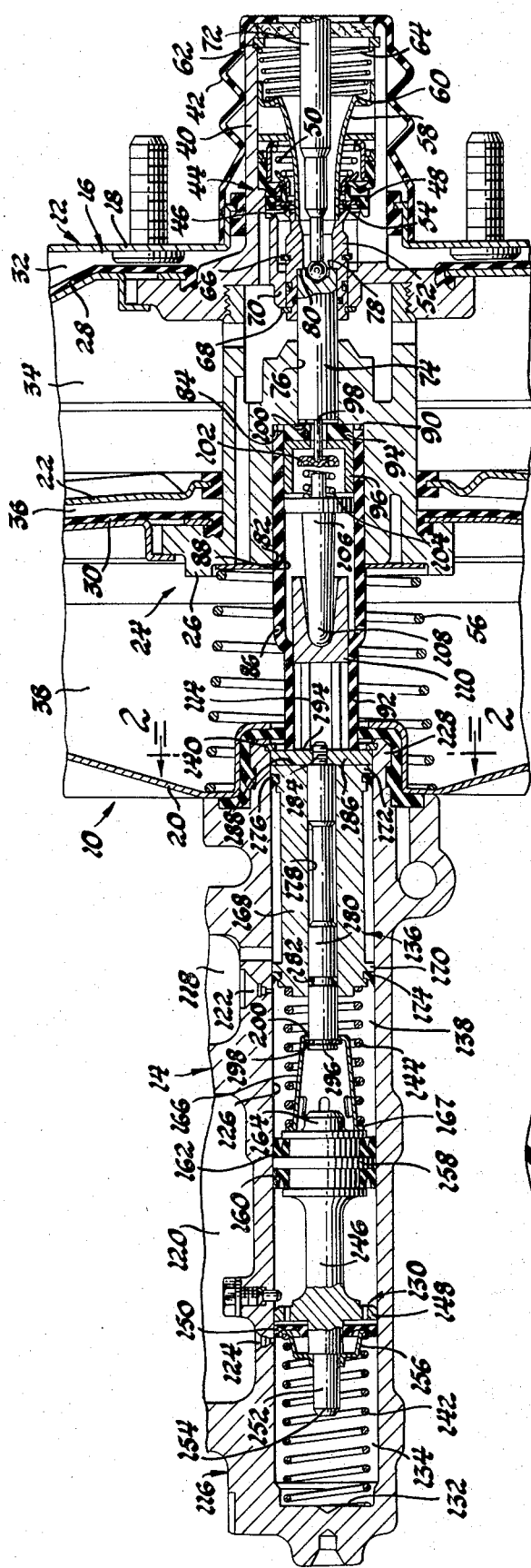
FIG. 1 is a cross section view of a brake booster and master cylinder assembly embodying the invention.

The brake booster and master cylinder assembly 10 includes a booster assembly 12 and a master cylinder assembly 14. The booster assembly is illustrated as being a vacuum suspended-type booster similar to those currently used in production automobiles. It has a housing 16 provided with a rear wall 18, a front wall 20 and an intermediate wall 22. Power wall means 24 is contained within the booster housing 16 and includes the power piston 26 and diaphragms 28 and 30. The inner peripheries of the diaphragms are sealingly connected to the power piston 26 and to the housing 16, with the diaphragms being positioned in the housing on opposite sides of intermediate wall 22. The housing walls and diaphragms therefore divide the housing into chambers 32, 34, 36 and 38. Chambers 34 and 38 are interconnected and normally impressed with vacuum from a suitable vacuum source, as is well known in the art. When the booster is in the released position, chambers 32 and 36 are also impressed with vacuum. When the booster is actuated, as described below, atmospheric pressure is controllably admitted to chambers 32 and 36, causing the diaphragms and power piston to move leftwardly, as seen in FIG. 1, to actuate master cylinder assembly 14.

The power piston 26 has a rearwardly extending section 40 which extends out of the housing wall 18 and may be suitably covered by a boot 42. Section 40 has the booster control valve assembly 44 received therein. This valve assembly includes the vacuum valve seat 46, which is annularly formed as a part of piston 26, the valve member 48 mounted in section 40 for axial reciprocal movement relative to seat 46 and urged toward that seat by spring 50, and the valve input member 52. This input member is reciprocably mounted concentrically within the valve seat 46 and is formed to provide the air valve seat 54. This general arrangement is well known in the art and the manner of operation is likewise so well known as to only require a general description. In the normal released position, valve seat 54 engages valve member 48 and holds it away from valve seat 46 so that vacuum is supplied to all of the booster chambers 32, 34, 36 and 38. When the valve input member is moved leftwardly, valve member 48 follows until it engages vacuum valve seat 46, thus closing the vacuum connection to chambers 32 and 36. Further movement of the valve input member 52 moves valve seat 54 away from valve member 48, admitting air under atmospheric pressure to chambers 32 and 36. The pressure differentials acting on diaphragms 28 and 30 and on piston 26 cause the power wall assembly to move leftwardly against the booster piston return spring 56. Since the valve seat 46 and the valve member 48 are mounted in the piston section 40, they also move leftwardly relative to the valve input member 52. The valve member 48 therefore reengages the air valve seat 54, closing off the air pressure connection to chambers 32 and 36. When valve member 48 engages both seats 46 and 54, the valve assembly is in the poised position, holding in the booster the required pressure differential to maintain this position. Upon brake release, the valve input member 52 is moved rightwardly relative to piston 26, removing valve member 48 from the vacuum valve seat 46, thereby decreasing the pressure differential across diaphragms 28 and 30 and permitting rightward movement of the power wall means under the force of booster return spring 56. To this extent, the booster operates in the same manner as boosters currently used.

The booster valve input member 52 is engaged by an annular spring retainer 58 on its rightward end, the spring retainer being concentrically within and spaced from the valve member 48. The spring retainer is formed at the end opposite the valve input member 52 to provide a spring seat 60. Another spring seat 62, which may be a snap ring, is provided in the outer end of piston section 40 and a compression spring 64 is seated on seats 60 and 62 so as to urge spring retainer 58 leftwardly. Since the leftward end of the spring retainer 58 engages valve input member 52, the valve input member is also urged leftwardly. It is provided with a snap ring on another stop member 66 which can engage one side of shoulder 70 on piston 26 to limit its leftward movement relative to piston 26. Valve input member 52 is provided with another snap ring or stop member 68 on the opposite side of the piston shoulder 70, so as to limit rightward movement of the valve input member relative to the piston 26. Thus, shoulder 70 is positioned between snap rings 66 and 68 and limits valve input movement beyond a predetermined amount.

The push rod 72 is suitably connected at one end, not shown, to the brake pedal so as to be movable leftwardly under brake pedal actuating force exerted manually by the vehicle operator. The other end of push rod 72 is suitably connected, as by a ball and socket pivot joint, to a force transmission member 74. Member 74 is reciprocably received in a bore 76 formed in piston 26. The right end of member 74 adjacent the ball and socket joint has a shoulder 78 which mates with a shoulder 80 formed interiorly of the valve input member 52. The valve input member is generally annular in form so that the push rod 72 and the member 74 extend therethrough. Other than the abutting engagement of shoulder 78 and 80, there is no direct mechanical force transmitting connection between the valve input member 52 and the push rod 72 with its member 74. It can be seen that the shoulder engaging connection is maintained, within limits established by snap rings 66 and 68 and piston shoulder 70, by the force of spring 64 acting on the valve input member through spring retainer 58. Thus, the valve input member 52 will follow the manual input movements of the push rod 72 to control the brake booster.

The leftward end of piston bore 76 has an enlarged section 82 joining the other portion of the bore at shoulder 84. A power force transmission output member 86 is reciprocably received within bore section 82 and is generally tubular in form so as to have a cylinder wall 88 interiorly thereof. The right end 90 of output member 86 is engageable with shoulder 84 for transmission of brake booster generated force in a leftward direction. The left end 92 of output member 86 forms a master cylinder input member and is arranged to actuate the master cylinder assembly 14 in a manner to be described. A reaction disc 94, suitably formed of a rubber-like material, is received within the cylinder wall 88 of member 86 adjacent output member end 90 so that its outer periphery engages the cylinder wall 88, one side engages shoulder 84, and the other side is engaged by a movable cup 96 which is reciprocably mounted within the cylinder wall 88. The disc 94 and cup 96 are axially apertured so that a reduced diameter extension 98 of the force transmission member 74 extends therethrough from a shoulder 100 of member 74. Extension 98 has a spring seat 102 mounted on its leftward end within cup 96 and supporting the right end of compression spring 104. A piston-like output member 106 is reciprocably received within the cylinder wall 88 and the left end of spring 104 is seated against it. The left end 108 of output member 106 engages a bifurcated master cylinder input member 110, which is reciprocably received within the left end 92 of member 86. Bifurcated member 110 has two legs 112 and 114, better seen in FIG. 2, which are in cross section preferably formed as arcuate portions, located in diametrically opposed relation.

The master cylinder assembly 14 includes a housing 116 having brake fluid reservoirs 118 and 120 respectively connected through compensation ports 122 and 124 with bore 126. The right or rear end 128 of housing 116 is suitably secured to the wall 20 of the brake booster assembly and the open end of the bore 126 extending through end 128 is aligned to receive the master cylinder input members formed by left end 92 of member 86 and the bifurcated member 110. A secondary pressurizing piston assembly 130 is reciprocably received in the forward end of bore 126 and is normally axially spaced from the bore end 132 to form within the bore the secondary pressurizing chamber 134. A primary pressurizing piston assembly 136 is reciprocably received in the rear end of bore 126 in axial alignment with piston assembly 130 and is normally spaced from piston assembly 130 to form the primary pressurizing chamber 138 in the bore between the two piston assemblies. A piston stop in the form of snap ring 140 is inserted in the rear end of the bore 126 to provide a rearward stop for piston assembly 136. Piston return springs 142 and 144 are respectively positioned in chambers 134 and 138 and, as will be further described, cooperate to hold piston assembly 136 in abutting relation with stop 140 when the master cylinder is not actuated and thereby precisely position both piston assemblies so that compensation port 122 is open to chamber 138 and compensation port 124 is open to chamber 134.

Piston assembly 130 includes a piston 146, which is generally spool-shaped. The forward piston land 148 has a piston cup 150 engaging the forward end thereof and also acting as a valve to close compensation port 124 when the piston is moved in the pressurizing direction. An axially positioned piston extension 152 extends forwardly of land 148 and the extension end 154 is aligned for engagement with bore end 132 after a predetermined amount of forward movement of the piston. A spring seat 156 is mounted on extension 152 and receives one end of piston return spring 142. The other end of spring 142 engages bore end 132. The rear land 158 of piston 146 has oppositely directed V-block seals 160 and 162 thereon which effectively seal the chambers on both sides of land 158. A rearwardly extending boss 164 is provided on the rear face of land 158 and is sufficiently smaller in diameter to permit the spring retainer 166 to have its annular forward end 167 engage the annular surface of land 158. The retainer forward end 167 is flanged to provide a seat for the forward end of piston return spring 144. The forward end 167 of retainer 166 is pressed against the annular surface of land 158 but is not otherwise connected thereto to permit leftward movement of the secondary piston 146 without a corresponding movement of said retainer 166. The retainer 166 and spring 144 are considered to be parts of the primary piston assembly 136, and are located in chamber 138.

Piston assembly 136 includes a first primary piston 168, which is generally spool-shaped and provided with a front land 170 and a rear land 172. Cup-like seals 174 and 176 are respectively provided on lands 170 and 172 to seal with the bore 126. Piston 168 has a bore 178 extending axially therethrough so as to reciprocably receive the second primary piston 180. Thus the two primary pistons are concentrically mounted. A seal 182 is provided between the two pistons to seal bore 178.

Figure 2:
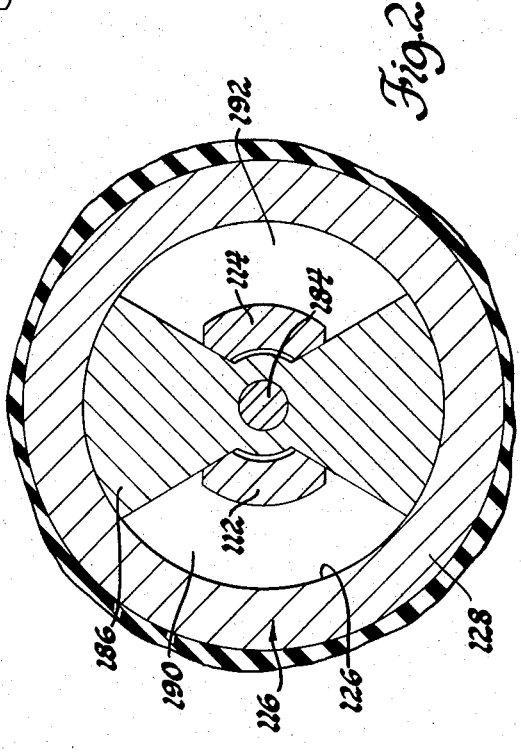
FIG. 2 is a cross section view of a portion of the master cylinder assembly of FIG. 1, taken in the direction of arrows 2—2 of that FIGURE.

The rear end 184 of piston 180 extends out of bore 178 past the first primary piston rear land 172 and has secured thereto a plate member 186. The plate member is of substantially the same diameter as piston land 172 and is axially positioned between that land and piston stop 140. The plate member is apertured or otherwise suitably formed to provide axially extending openings therethrough which are positioned radially outward of the end 184 of piston 180 so that the apertures are in axial alignment with at least portions of the rear face 188 of land 172. In the particular construction shown in the drawing, plate member 186 is shaped somewhat like a butterfly or bow tie, as seen in FIG. 2. The apertures in this instance are formed at 190 and 192 by the arcuately omitted portions of the plate member. The apertures are so arranged that the bifurcated member legs 112 and 114 respectively extend through the apertures with their forward ends engaging the rear face 188 of piston 168, but not engaging, in axial force transmitting relation, the plate member 186 or piston 180.

The forward end 92 of member 86 abuts the rear face 194 of plate member 186 in axial force transmitting relationship so that when brake apply force is tranmitted through member 86, it passes through plate member 186 to both pistons 168 and 180, moving them concurrently in a forward direction away from stop 140. However, if brake actuating force is transmitted only through the bifurcated member 110, only piston 168 is moved forwardly, leaving plate member 186 in position against stop 140 and affording no movement of piston 180.

The forward end 196 of piston 180 has a stop 198 thereon in the form of a snap ring, the piston end and snap ring being located in chamber 138. The rear end 200 of spring retainer 166 is received over snap ring 198 and inwardly flanged to normally rest against the snap ring when the master cylinder is in the released position. Thus, spring 144 is caged between spring seat 167 and the forward face of piston land 170, which provides a spring seat for the rear end of spring 144. The inwardly flanged end 200 of spring retainer 166 is slidably mounted relative to piston 180 so that some relative movement can occur. Under certain conditions of operation, such as when the master cylinder is actuated but no pressure is generated in chamber 138, piston 168 can move forwardly against spring 144 until the forward face of the piston engages the spring retainer end 200. This will result in a mechanical force transmitting connection through abutting surfaces to move piston assembly 130 forwardly even though no pressure is generated in chamber 138. If this occurs under power boost actuation, piston 180 will move with piston 168.

In normal brake operation, with the primary pressurizing chamber 138 connected to one brake circuit and the secondary pressurizing chamber 134 connected to the other brake circuit, both brake circuits will be pressurized in response to forward manual movement of push rod 72 when the vehicle operator actuates the brake pedal. This movement of push rod 72 moves force transmission member 74 forwardly, actuating the valve assembly 44 as earlier described, and also slightly compressing spring 104. The shoulder 100 of force transmitting member 74 will engage the inner portion of reaction disc 94 and shoulder 84 of the power piston 26 will engage the outer portion of the reaction disc and the rear end of member 86. The power brake apply force which moves piston 26 leftwardly is transmitted primarily through member 86 to move both primary pistons 168 and 180 in the forward, fluid pressurizing, direction. Some of the power apply force is also transmitted through reaction disc 94 and cup 96 to output member 106 and bifurcated member 110 to exert some power generated force directly on piston 168. Reaction to this force will be returned through the reaction disc and a portion thereof exerted through the inner portion of disc 94 against force transmission member 74 to the push rod 72 to provide "feel" to the brake pedal. With both primary pistons moving leftwardly, force is also transmitted through spring 144 to move piston assembly 130 leftwardly. Cups 150 and 174 respectively cover compensation ports 122 and 124, and further leftward movement pressurizes fluid in chambers 134 and 138, actuating the brakes.

If the brakes are applied and no booster power is available, initial leftward movement of force transmission member 74 by push rod 72 will cause the valve assembly 44 to operate as before. However, with no pressure differential imposed thereon, the power wall of the booster will not be moved against the return spring 56. Piston 26 will not be axially moved and, therefore, member 86 will not be axially moved. Since movement of member 86 is necessary to move plate member 186 and piston 180, those elements will not be moved axially. However, the manually exerted force transmitted through member 74 will pass through reaction disc 94 after shoulder 100 engages it, and cup 96 will be moved leftwardly. This will in turn move member 106 leftwardly, causing the bifurcated master cylinder input member 110 to be moved leftwardly. Since the bifurcated ends only engage piston 168, this leftward movement will result in movement only of primary piston 168, closing compensation port 22 and then commencing to pressurize fluid in chamber 138.

Since the effective area of the primary piston assembly is now smaller, a greater hydraulic pressure for a given input force will result. While this pressure will be lower in terms of brake pedal stroke, it will be greater than would be the case if the primary piston assembly had the same effective area at all times. This relatively high hydraulic pressure will be generated in both pressurizing chambers 138 and 134 because of the balancing action of the secondary piston assembly caused by leftward movement of the secondary piston 146 away from the end 167 of retainer 166 in response to increased pressurization of fluid within the pressurizing chamber 138. The booster piston return spring 56 need not be manually overcome. It is for this reason that the valve input member 52 is not mechanically fastened to the push rod 72 or member 74. As can be seen, the arrangement permits the push rod 72 to manually move member 74 away from the valve input member, separating shoulders 78 and 80, after snap ring 66 engages shoulder 70. This will also occur upon booster run-out when there is insufficient pressure differential to fully actuate the assembly.

Since there is no secured connection between the booster input and the valve, the preload forces on the various springs in the system must be carefully controlled to insure proper operation. The booster return spring is required so that the booster is fully returned when the brakes are not applied. Piston return spring 142 acts through the piston assemblies, including spring 144, and then through the booster output members and the force transmission member 74 to move valve input member 52 rightwardly against the force of spring 64 and to also move the push rod 72 to the brake release position. In order to accomplish this, and to insure the proper relationship between the master cylinder piston assemblies, the preload on spring 144 must be greater than the force from spring 142. Spring 104 also acts to insure the full return of valve input member 52 and valve 48. Therefore, the preload force on spring 104 is greater than the preload force on spring 64 but is less than the preload force of spring 142. Springs 64 and 104 insure direct mechanical contact between transmission member shoulder 78 and valve input member shoulder 80 unless there is a loss of brake booster power. There is also sufficient clearance provided between the booster piston 26 and the member 86 so that the displacement required in the reaction disc 94 to balance the booster valve can be obtained for all power operating conditions. The area ratio between primary pistons 168 and 180 is selected so that the change in pedal displacement in the event of loss of booster power is within an acceptable range. At the same time, there must be sufficient difference in the areas of these pistons to achieve the desired amount of reduced pedal effort under this circumstance.

What is claimed is:

1. A brake booster and master cylinder assembly comprising:

a master cylinder housing having a bore, first and second concentric primary pistons and a secondary piston reciprocably received in said bore and defining therewith a primary pressurizing chamber between said primary and secondary pistons and a secondary pressurizing chamber between said secondary piston and one end of said bore, said second primary piston having on the end thereof opposite said secondary piston an apertured plate member adjacent and engageable with the end of said first primary piston opposite said secondary piston, and piston stop means in said bore, said plate member being axially intermediate said first primary piston and said stop means and engageable with said stop means and by said first primary piston to define the rest position of both of said primary pistons; first force transmitting means engaging said plate member axially opposite said first primary piston, and second force transmitting means extending through said apertured plate member and engaging said first primary piston for transmitting force to said first primary piston independently of said plate member and said second primary piston;

and a booster having first output means and second output means and manual input means and booster power control means operatively controlled by movement of said manual input means, said second output means being connected to transmit booster generated force to said first and second force transmitting means upon power operation of said booster, said manual input means being connected to transmit manually generated force to said first output means through said second force transmitting means, independently of booster power operation.

2. A brake and booster and master assembly comprising:

a brake booster having a housing, power wall means movable in said housing, a manual input member operably connected to an operator actuated brake member and reciprocal in said housing, said manual input member including a portion for transmitting input forces as said input member is reciprocated in said housing, a booster control valve operated by movement of said manual input member to cause said power wall means to move to a braking operative position when said manual input member is moved in response to braking action by an operator, manual output means moved in response to movement of said manual input member, a force reaction disc between said manual input member and said manual output means for transmitting reaction forces to said manual input member and to the operator from said first output means; a master cylinder having a first primary piston and a second primary piston for pressurizing brake fluid, a booster power output means including a tubular member with a first end around said reaction disc and extending from said power wall means to said primary pistons, a transfer plate member between said primary pistons and said tubular member for transmitting braking movement of said power wall means to both of said primary pistons for pressurizing fluid, said manual output means including a member operably engaged by and movable with said reaction disc and extending in bypass relation past said transfer plate member for engaging only said first primary piston to cause pressurization of fluid without movement of said second primary piston during operation of the brake assembly without power assist from said booster power wall mean.

3. A brake and booster and master assembly comprising:

a brake booster having a housing, power wall means movable in said housing, a manual input member operably connected to an operator actuated brake member and reciprocal in said housing, said manual input member including a portion for transmitting input forces as said input member is reciprocated in said housing, a booster control valve operated by movement of said manual input member to cause said power wall means to move to a braking operative position when said manual input member is moved in response to braking action by an operator, manual output means moved in response to movement of said manual input member, a force reaction disc between said manual input member and said manual output means for transmitting reaction forces to said manual input member and to the operator from said first output means; a master cylinder having a first primary piston and a second primary piston for pressurizing brake fluid, a booster power output means including a tubular member with a first end around said reaction disc and extending from said power wall means to said primary pistons, a transfer plate member between said primary pistons and said tubular member for transmitting braking movement of said power wall means to both of said primary pistons for pressurizing fluid, said transfer plate member having apertures formed therethrough, said manual output means including a bifurcated member operably engaged by and movable with said reaction disc and having leg portions extending through said transfer plate apertures in bypass relation to said transfer plate for engaging only said first primary piston to cause pressurization of fluid without corresponding movement of said second primary piston during operation of the brake assembly without power assist from said booster power wall mean.

* * * * *